United States Patent
Cioletti et al.

(10) Patent No.: US 6,453,544 B2
(45) Date of Patent: Sep. 24, 2002

(54) PRECISION ASSEMBLY TABLE AND METHOD

(75) Inventors: Joseph T. Cioletti, Pittsburgh, PA (US); Fred J. Gurney, Austin, TX (US); Frank E. Young, Murrysville, PA (US)

(73) Assignee: Maglev, Inc., Coraopolis, PA (US)

( * ) Notice: Subject to any disclaimer, the term of this patent is extended or adjusted under 35 U.S.C. 154(b) by 0 days.

(21) Appl. No.: 09/812,984

(22) Filed: Mar. 20, 2001

Related U.S. Application Data

(63) Continuation of application No. 08/989,993, filed on Dec. 12, 1997, now Pat. No. 6,202,275.

(51) Int. Cl.$^7$ .............................................. B23Q 15/00
(52) U.S. Cl. ........................................ 29/721; 29/281.1
(58) Field of Search .......................... 29/464, 469, 434, 29/407.05, 407.09, 407.1, 721, 281.1, 281.4, 281.5; 269/296, 266, 329, 309, 310, 900

(56) References Cited

U.S. PATENT DOCUMENTS

| | | |
|---|---|---|
| 1,684,729 A | 9/1928 | Denio |
| 3,590,465 A | 7/1971 | Cartier et al. |
| 4,003,511 A | 1/1977 | Schwestka |
| 4,047,709 A | 9/1977 | Thyberg et al. |
| 4,088,312 A | 5/1978 | Frosch et al. |
| 4,200,272 A | 4/1980 | Godding |
| 4,684,113 A | 8/1987 | Douglas et al. |
| 4,685,661 A | 8/1987 | Slocum et al. |
| 4,691,905 A | 9/1987 | Tamura et al. |
| 4,723,766 A | 2/1988 | Beeding |
| 4,771,529 A | 9/1988 | Jackson et al. |
| 4,934,063 A | 6/1990 | Speisser |
| 4,970,773 A | 11/1990 | Buchler et al. |
| 4,979,445 A | 12/1990 | Lanzara |
| 5,121,907 A | 6/1992 | Engwall |
| 5,163,793 A | 11/1992 | Martinez |
| 5,172,442 A | 12/1992 | Bartley et al. |
| 5,338,014 A | 8/1994 | Kitamura |
| 5,364,083 A | 11/1994 | Ross et al. |
| 5,372,357 A | 12/1994 | Blaimschein |
| 5,457,868 A | 10/1995 | Blaimschein |
| 5,546,784 A * | 8/1996 | Haas et al. |
| 5,590,870 A | 1/1997 | Goellner |
| 5,659,939 A | 8/1997 | Whitehouse |
| 5,722,646 A | 3/1998 | Soderberg et al. |
| 5,829,151 A | 11/1998 | Collier et al. |
| 5,901,426 A | 5/1999 | Okazaki et al. |
| 6,202,275 B1 * | 3/2001 | Cioletti et al. |

FOREIGN PATENT DOCUMENTS

| | | |
|---|---|---|
| JP | 54-43384 | 4/1979 |
| JP | 63-217212 | 9/1988 |

OTHER PUBLICATIONS

Karl Kurz, Developing a flexible automated fixturing device; Mechanical Engineering. ISSN: 00256501, Jul. 1994.

* cited by examiner

Primary Examiner—David P. Bryant
(74) Attorney, Agent, or Firm—Reed Smith LLP

(57) ABSTRACT

A precision assembly table and method includes a plurality of rigid bars connected to adjustable support members which can individually adjust the position of the rigid bars above a surface and a frame to create a desired contour. The structure to be assembled, such as a magnetic levitation guideway, is positioned and held in place on top of the rigid bars which have been positioned so as to define a desired contour of the structure and to which the structure will mechanically conform. The position of the rigid bars is monitored and adjusted by a computer to maintain the desired contour while the structure resting on the rigid bars is being assembled.

16 Claims, 3 Drawing Sheets

PRECISION ASSEMBLY TABLE AND METHOD

This application is a continuation of Ser. No. 08/989,993, filed Dec. 12, 1997, now U.S. Pat. No. 6,202,275.

FIELD OF THE INVENTION

The present invention relates generally to an apparatus and a method for precision manufacturing and assembly of contoured or curved metallic structures, and more particularly to the precision manufacturing and assembly of magnetic levitation vehicle guideways.

BACKGROUND OF THE INVENTION

The precision manufacture of contoured or curved metallic structures such as guideways for magnetic levitation vehicles, bridge structures such as highway overpasses, and offshore oil rig drilling platforms is currently expensive, time consuming, and in many cases impossible to perform within the tolerances mandated by the application. Magnetic levitation vehicle guideways, for example, are required to meet stringent tolerances in their manufacture in order for the magnetic levitation vehicles to properly and safely operate over the guideways.

Magnetic levitation vehicles are capable of traveling over three (3) eighty-two (82) foot long sections of guideway in one (1) second of time, but can not operate over excess up, down, or side to side nonconformities or departures from the design contour in the guideway. To accommodate such speeds and operation, an eighty-two (82) foot section of guideway must be manufactured and assembled so that operational components can be positioned to plus or minus 0.1 mm (one-tenth of one millimeter) tolerance of the design contour across the length of the finished beam.

Current manufacturing and assembly methods are not capable of the timely and cost-effective manufacture of contoured or curved metallic structures, such as guide plates, bridge support beams, and oil rig supports, to ensure that operational components can be positioned to plus or minus 0.1 mm (one-tenth of one millimeter) tolerance of the design contour across the length of the finished structures. Current methods of manufacture and assembly are labor intensive, imprecise, and expensive. Such methods are unacceptable for the construction of magnetic levitation transportation systems.

For example, a recent proposed magnetic levitation transportation system required 650 guideway sections in 350 different configurations. Current labor intensive manufacturing methods for such a project are cost prohibitive.

In an age of budget cutbacks and cost-effective projects, a more precise, automated, inexpensive, and faster apparatus for and method of manufacture of precision structures is needed.

SUMMARY OF THE INVENTION

Disclosed is a precision assembly table comprising a frame, a surface connected to the top of said frame, and a plurality of rigid support bars above said surface that define a contoured surface upon which items to be assembled, such as magnetic levitation guideway structures, are positioned. The assembly table includes a plurality of adjustable support members wherein each of said rigid support bars is connected to at least two of said adjustable support members, and wherein said adjustable support members are connected to said frame, such that the position of each of said rigid support bars above said frame and said surface is capable of individual adjustment and the countered surface desired for the items being assembled, such as a magnetic levitation vehicle guideway, and defined by said rigid support bars is capable of adjustment by adjustment of said adjustable support members.

Further disclosed is a method of assembling a contoured structure, such as a magnetic levitation vehicle guideway, comprising positioning of a portion of a structure on a manufacturing assembly table comprising a plurality of individually adjustable bars that define a contoured surface, individually adjusting said plurality of adjustable bars to the desired contoured surface of said portion of a structure, holding the portion of the structure in position with a hold down fixture, allowing said portion of a structure to mechanically conform to said contoured surface established by said plurality of adjustable bars, and connecting the remaining portions of a contoured structure, such as a guideway, to the portion of the structure, such as a guide plate, positioned on the manufacturing assembly table after the portion of the structure has conformed to said contoured surface to form said contoured structure.

DETAILED DESCRIPTION OF PREFERRED EMBODIMENTS

Figure 1:
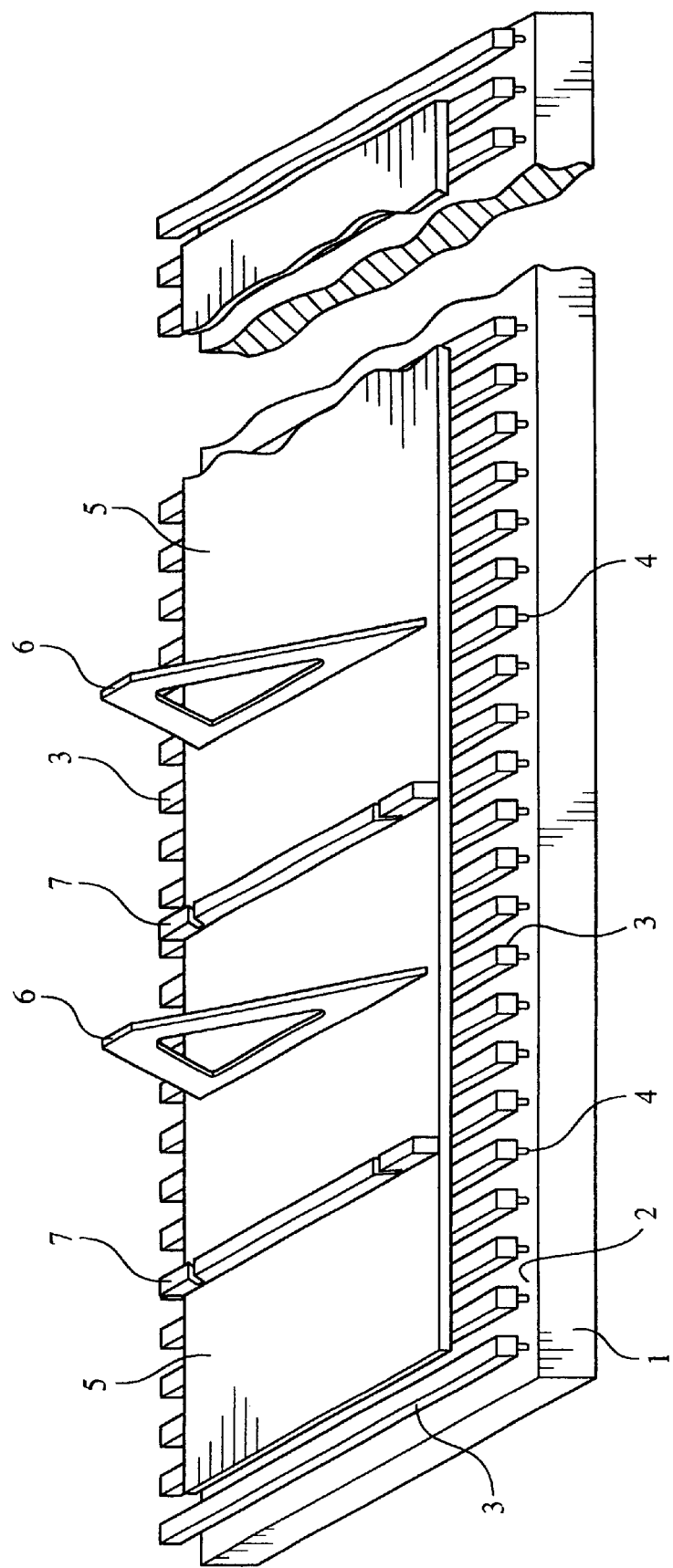
FIG. 1 is a perspective view of the precision assembly table with a partial guideway assembly positioned on it.
Figure 2:
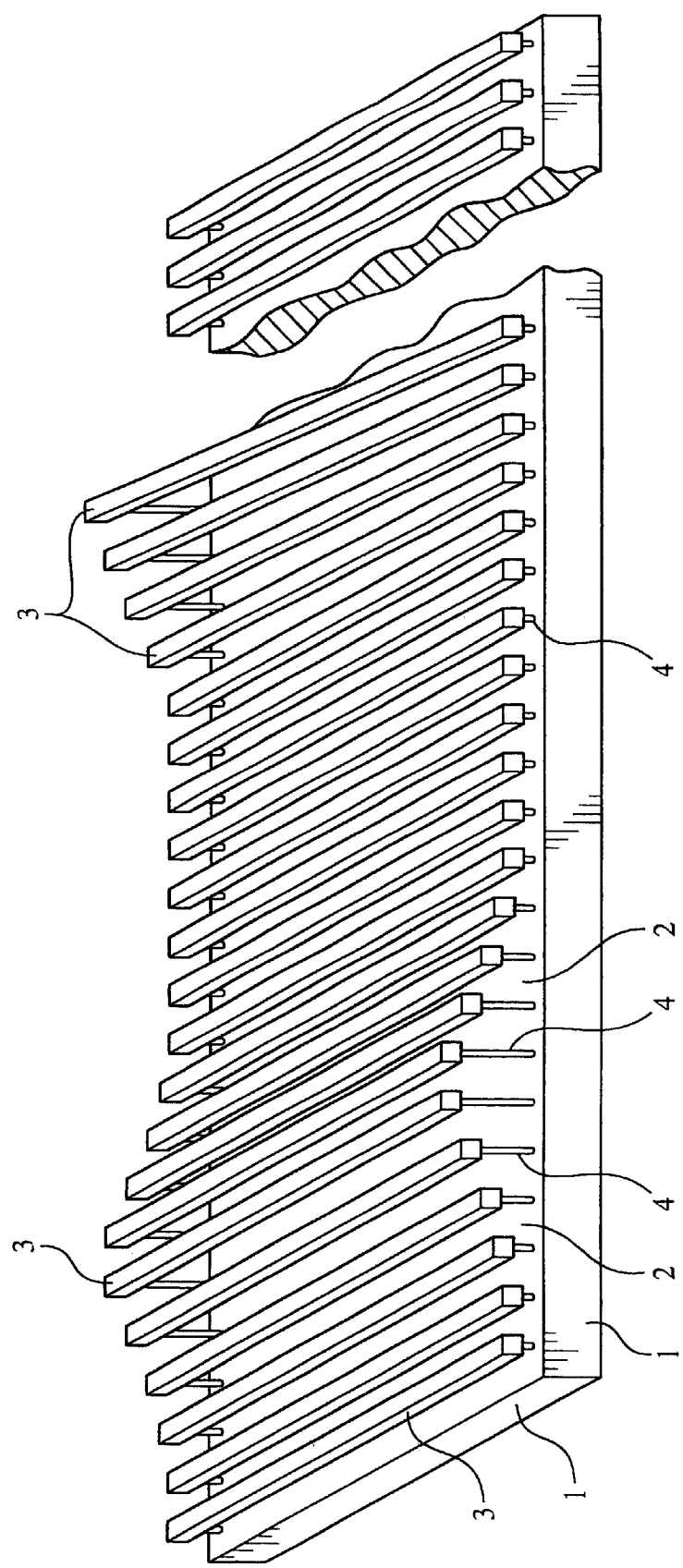
FIG. 2 is a perspective view of the precision assembly table with its rigid bars positioned in a curved contour.
Figure 3:
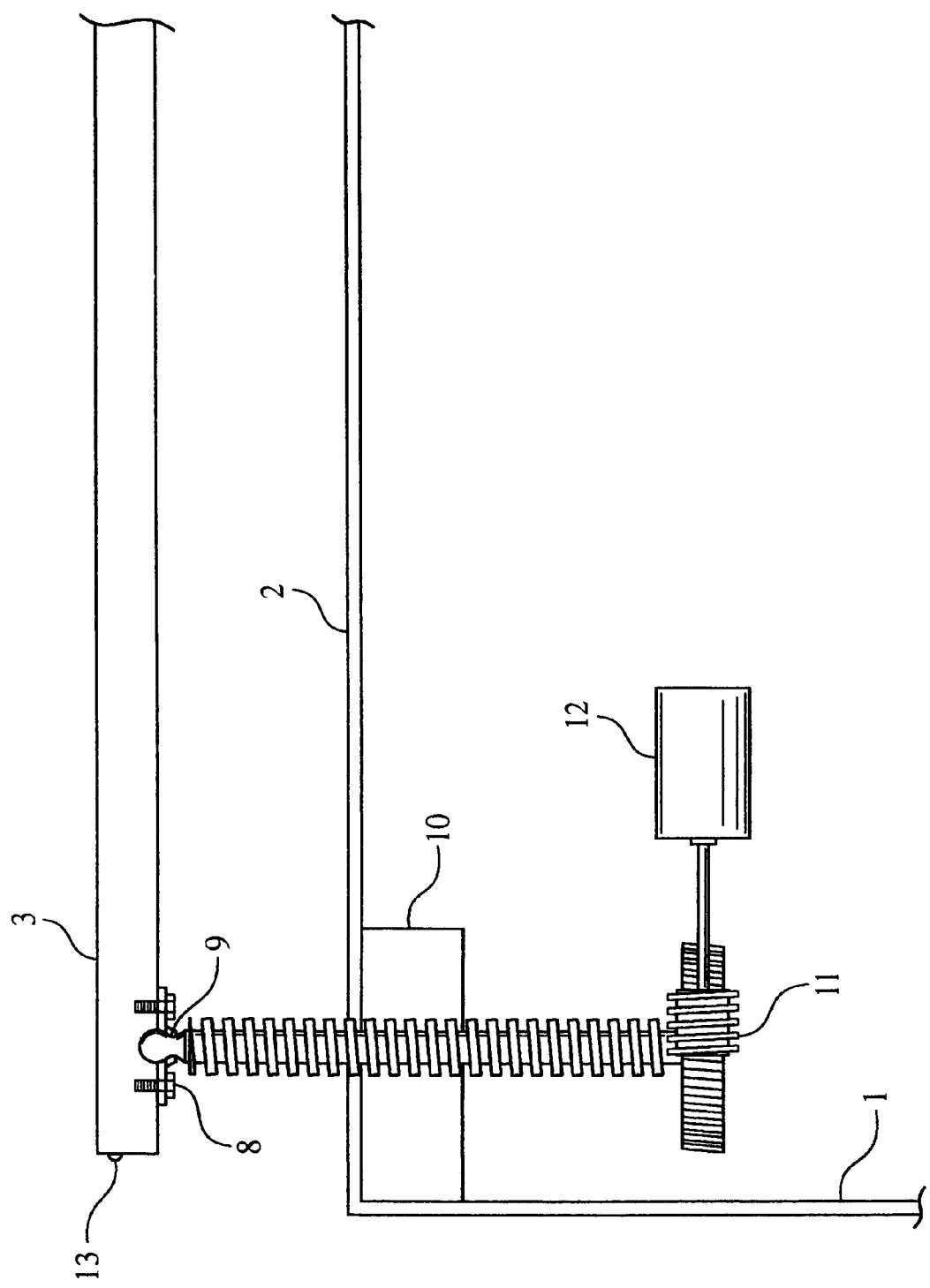
FIG. 3 is a cross-sectional view of one-half of the precision assembly table depicting a screw mechanism as an adjustable support member connected to the rigid bar and table surface.

The precision assembly table of the present invention consists of a frame 1 connected to a surface 2 over which rigid bars 3 are positioned by adjustable support members 4 which are connected to the rigid bars 3 and the frame 1 and necessarily pass through the surface 2 as depicted in FIGS. 1, 2 and 3. As depicted, the frame 1 supports the surface 2 above the ground, and the frame further supports the adjustable support members 4 which protrude through the surface 2 to support the rigid bars 3 above the surface 2, above the frame 1, and above the ground.

The frame 2 in the preferred embodiment is very rigid and connected to the factory floor or ground to prevent movement of the frame 2, thereby avoiding interference with the assembly. The frame 2 can be of a variety of configurations, provided that it provides a rigid and stable apparatus upon which the surface 2 and adjustable support members 4 can be connected. The surface 2 is utilized to shield the frame 1 and the apparatus associated with the adjustable support members, depicted in FIG. 3, from materials and damage resulting from the assembly operations taking place on top of the rigid bars 3.

The surface 2 as depicted in FIG. 3 may be used to support apparatus associated with the adjustable support members but is not essential to the practice of the invention and operation of the precision assembly table. The frame 1 may be used in connection with the adjustable support members 3 and rigid bars 2 without the presence of the surface 2, whereby the apparatus would perform the method of assembly in the same manner. The structures to be assembled, such as guideways, are not required to, and preferably do not, rest on the surface 2 but rather on the tops of the rigid bars 3 as depicted in FIG. 1 which shows a magnetic levitation guideway guide plate 5 positioned on the tops of the rigid bars 4.

In the preferred embodiments of using the precision assembly table, a hold down fixture (not shown) for positioning and holding the items being assembled in place on the top of the rigid bars 3 is utilized. The hold down fixture in the preferred embodiment preferably consists of a plurality of clamps holding the item to be assembled in place on the top of the rigid bars 3, and for that purpose is preferably connected to the rigid bars 2 themselves or to the surface 2 or the frame 1, depending on, for example: (1) the application the precision assembly table is being used for; and/or (2) any space restraints imposed because of, for example, the building surrounding the precision assembly table.

The rigid bars 3 in the preferred embodiment are made of low thermal expansion coefficient metallic material such as INVAR or Ni-span-C such that the heat of any welding performed on the items being assembled on the rigid bars 3 minimally impacts the position and shape of the rigid bars 3.

The assembly of items on the precision assembly table will most preferably be accomplished without the application of heat, other than incidentally due to the effects of welding. Should the precision assembly table or its components such as the rigid bars 3 and frame 1, and to a lesser degree the surface 2, become heated or elevated in temperature, cooling is preferably provided by the application of, for example, a liquid coolant, most preferably water, on the surfaces of the precision manufacturing table and its components. Alternatively, water or another liquid coolant may be pumped through the frame 1, surface 2, and rigid bars 3 of the precision manufacturing table to keep such components at lower temperatures. Such cooling is intended, inter alia, to assist in the prevention of deformation due to heating and elevated temperatures. The use of coolants would especially be preferred if the rigid bars were not made of a material with a low thermal expansion coefficient.

The rigid bars 3 in the preferred embodiment for use in the assembly of magnetic levitation vehicle guideways would be parallel to each other and approximately one foot apart. Other applications and particularly complex or curved contours may require more rigid bars 3 closer together. In some circumstances, the rigid bars 3 would not necessarily need to be parallel to each other. Some applications would not require as many rigid bars 3 such that the rigid bars 3 could be placed more than one foot apart. The skilled artisan is credited with the ability to ascertain any such requirements that such applications may require with respect to such spacing.

The rigid bars 3 are supported above the surface 2 by adjustable support members 4. At least two adjustable support members 4 are most preferred to support and adequately position the rigid bars 3. As depicted in FIG. 1, a structure to be assembled, such as a guide way with a guide plate 5, is most preferably positioned on the top surface of the rigid bars 3.

In a most preferred embodiment (as depicted in FIG. 3), the adjustable support members 4 comprise a screw 14 connected to the rigid bar 3 by a ball 9 and socket 8 on one end and to a precision worm gear 11 connected to an electric servo motor 12 on the other end. The socket 8 on the opposite end of the rigid bar 3 (not shown) in a preferred embodiment would be affixed in a slot (not shown) within the rigid bar 3 or affixed to the rigid bar 3 to allow the length of the span of the rigid bar 3 between the two sockets 8 to vary so as to accommodate adjustment of the position of the rigid bar 3. The screw 14 protrudes through an opening in the surface 2 and is held in place by a fixed threaded collar 10 connected to the surface 2 and the frame 1 of the precision assembly table.

In a particularly preferred embodiment, the screw 14 pitch yields a 5.0 mm (five millimeters) or less elevation change per a 360 degree rotation. The precision worm gear 11 preferably has a reduction ratio of 100:1 or greater. The electric servo motor 12 is preferably controlled to plus or minus 15 degrees in rotation, most preferably by computer input. Thus, by way of example, for a one degree rotation of the electric servo motor 12, the adjustment in the height of the rigid bar 3 above the surface 2 would be 0.013 mm. As a further example, for a one twenty-fourth of one degree rotation, the adjustment would be 0.000579 mm. Many other screw 12 pitch, precision worm gear 11 reduction ratios, and electric servo motor 12 rotations are, therefore, possible as the foregoing indicates.

In the most preferred embodiment, the rigid bars 3 are square or slightly rectangular shaped in cross-section. The top surface of the rigid bars 3 are shaped as elongated rectangles as are the sides and bottom of the rigid bards 3. Other shapes for the rigid bars 3 are possible and contemplated, provided that a surface is provided on which the items to be assembled can be positioned.

Preferably, an item such as the guide plate 5 of a magnetic levitation vehicle guideway depicted in FIG. 1 is positioned on and rests on the plurality of rigid bars 3. The guide plate 5 or other structure positioned on the rigid bars 3 is held in position by a hold down fixture, such as a clamps, at various locations on the guide plate 5 or other structure. The rigid bars as depicted in FIG. 1 can be positioned relatively flat or parallel to the surface 2. In such a case and other similar situations, a hold down fixture would not be necessary.

The rigid bars 3 can be individually adjusted to positions of varying height above the surface 2, as depicted in FIG. 2. For example, one end of each rigid bar 3 can be positioned at a different height than the other end of that same rigid bar 3 to form complex contours with complex curves, as depicted in FIG. 2. The adjustable support members 4 are preferably extended to varying heights above the surface 2 to position the rigid bars 3 at varying heights above the surface. Hold down fixtures such as clamps would preferably be used to hold the structure, such as the guide plate 5 depicted in FIG. 1, to the rigid bars 3 which are positioned in complex shapes as depicted in FIG. 2.

The tops of the rigid bars 3 depicted in FIG. 2 preferably form a complex shape to which the structure, such as a guide plate 5, conforms to mechanically, by either the application of a hold down fixture to press or hold the structure (such as a guide plate 5) in contact with the tops of the rigid bars 3 or by the force of gravity. For thin structures, such as guide plates, or for relatively flat contours, as depicted in FIG. 1, gravity will suffice to mechanically shape the structure to the contour defined by the tops of the rigid bars 3. For thicker structures or complex contours, as depicted in FIG. 2, a hold down fixture is most preferably utilized to mechanically shape the structure to the contour defined by the tops of the rigid bars 3. Once the structure, such as the guide plate 5 depicted in FIG. 1, has conformed to the desired contour due to gravity or the application of a hold down fixture, the various other pieces of the structure, such as the guide way structure 6,7 depicted in FIG. 1, can then be welded or attached to contoured portion of the structure on the precision assembly table, such as the guide plate 5 as depicted in FIG. 1.

In order to ensure maximum precision and speed, the height and position of the rigid bars 3 and adjustable support members 4 are preferably calculated by and controlled by a computer. The initial position of the rigid bars 3 is preferably determined and the positions of the adjustable support members 4 and the rigid bars 3 connected thereto are then positioned. To accomplish the positioning, a computer is preferably linked directly into the controls for the adjustable support members 12, or the electric servo motors 12 used to position the adjustable support members 4 as depicted in FIG. 3.

In a preferred embodiment, while the various pieces of the structure are being assembled on the precision assembly table, the force and heat of the welding and attachment being performed may change the position of the rigid bars 3, such that the desired contour formed by the tops of the rigid bars 3 is not held. To ensure that the desired contour is held, sensors, or a reflector 13 as depicted in FIG. 3, are preferably connected to both ends of a rigid bar 3. Sensors or reflectors 13 are preferably attached to both ends of every rigid bar 3 to ensure maximum measurement. Alternatively, sensors or reflectors 13 can be attached to every other rigid bar 3 or some lesser or greater fraction thereof.

In a preferred embodiment, a laser scan is used to scan reflectors 3 attached to the ends of each rigid bar 3 and to determine the positions of the rigid bars 3. The results of the laser scan measurements are then input into a computer which compares the scanned positions of the rigid bars 3 with the desired positions of the rigid bars 3. The computer can then determine the amount of adjustment needed for the adjustable support members 4 to move the rigid bars 3 to their desired or design positions. The computer can then send signals via its direct link to the controls or electric servo motor 12 of each adjustable support member 4 to make any adjustments. This feedback type of measurement and adjustment can be repeated as often as necessary, preferably continuously, while the structure is being assembled on the precision assembly table. The computer and laser scan or other measurement device or sensors can also be used to initially set the positions of the rigid bars 3.

Preferably, the structure to be assembled can be placed on the precision manufacturing table before the rigid support bars 3 are positioned in the desired configuration. More preferably, the rigid bars 3 would be positioned in the desired contour prior to the placement of the structure on the rigid bars 3 to prevent the loading of the adjustable support members due to the weight of the structure on the rigid bars.

The embodiments described above are to be considered in all respects only as illustrative and not restrictive. The scope of the invention is indicated by the following claims rather than the foregoing description. All changes which come within the meaning and range of equivalency of the claims are to be embraced within their scope.

What is claimed is:

1. A precision assembly apparatus comprising:

a frame;

a plurality of rigid bars upon which items to be assembled are positioned;

a plurality of adjustable support members wherein each of said rigid bars is connected to at least two of said adjustable support members and wherein said adjustable support members are connected to said frame such that the position of each of said rigid bars above said frame is capable of individual adjustment and the contour defined by such rigid bars is adjustable by adjustment of said adjustable support members; and a hold down fixture capable of holding said items to be assembled in position.

2. The precision assembly apparatus in claim 1 wherein each of said adjustable support members is a screw.

3. A precision assembly table comprising:

a frame;

a surface connected to the top of said frame;

a plurality of rigid bars above said surface that define a contoured surface upon which items to be assembled are positioned;

a plurality of adjustable support members wherein each of said rigid bars is connected to at least two of said adjustable support members and wherein said adjustable support members are connected to said frame such that the position of each of said rigid bars above said frame and said surface is capable of individual adjustment and the countered surface defined by said rigid bars is capable of adjustment by adjustment of said adjustable support members; and a hold down fixture capable of holding said items to be assembled in position.

4. The precision assembly table in claim 3 wherein each of said adjustable support members comprises a screw.

5. The precision assembly table in claim 3 wherein each of said adjustable support members comprises a screw connected to said rigid bar with a ball and socket and wherein said screw is adjusted by operation of an electric servo motor upon a worm gear connected to said screw.

6. The precision assembly table in claim 3 further comprising:

position sensors connected to the ends of said rigid bars capable of monitoring the position of said rigid bars.

7. The precision assembly table in claim 3 further comprising:

reflectors connected to the ends of said rigid bars capable of measuring the position of said rigid bars by application of a laser scan on said reflectors.

8. The precision assembly table of claim 3 wherein said rigid bars are positioned parallel to each other.

9. The precision assembly table of claim 3 wherein the adjustment of the adjustable support members and position of said rigid bars is computer controlled.

10. A precision magnetic levitation vehicle guideway assembly table comprising:

a frame;

a surface connected to the top of said frame;

a plurality of rigid bars above said surface that define a contoured surface upon which the guide plate of a magnetic levitation vehicle guideway to be assembled is positioned;

a plurality of adjustable support members wherein each of said support bars is connected to at least two of said adjustable support members and wherein said adjustable support members are connected to said frame such that the position of each of said rigid bars above said frame and said surface is capable of individual adjustment and the countered surface defined by said rigid bars and to which said guide plate will mechanically conform is capable of adjustment by adjustment of said adjustable support members; and a hold down fixture capable of holding said guide plate in position.

11. The precision assembly table in claim 10 wherein each of said adjustable support members comprises a screw.

12. The precision assembly table in claim 10 wherein each of said adjustable support members comprises a screw connected to said rigid bar with a ball and socket and wherein said screw is adjusted by operation of an electric servo motor upon a worm gear connected to said screw.

13. The precision assembly table in claim 10 further comprising:

position sensors connected to the ends of said rigid bars capable of monitoring the position of said rigid bars.

14. The precision assembly table in claim 10 further comprising:

reflectors connected to the ends of said rigid bars capable of measuring the position of said rigid bars by application of a laser scan on said reflectors.

15. The precision assembly table of claim 10 wherein said rigid bars are positioned parallel to each other.

16. The precision assembly table of claim 10 wherein the adjustment of the adjustable support members and position of said rigid bars is computer controlled.

* * * * *